United States Patent [19]

Bouit et al.

[11] Patent Number: 5,482,126
[45] Date of Patent: Jan. 9, 1996

[54] TRACK-TENSIONING EQUIPMENT

[75] Inventors: René Bouit, Riorges; André Lorrain, Mably; Jacques Tillier, Montagny, all of France

[73] Assignee: Giat Industries, France

[21] Appl. No.: 352,245

[22] Filed: Dec. 8, 1994

[30] Foreign Application Priority Data

Dec. 8, 1993 [FR] France ................................ 93 14704

[51] Int. Cl.⁶ .................................................. B62D 55/30
[52] U.S. Cl. ............................... 180/9.1; 305/10; 305/32; 474/110
[58] Field of Search ..................... 180/9.1, 9.42, 180/9.48, 9.5, 9.52, 9.62, 9.64; 305/10, 29, 30, 32; 474/110, 112

[56] References Cited

U.S. PATENT DOCUMENTS 3,310,127 3/1967 Siber et al. ....................... 180/9.1

5,183,287 2/1993 VanSweden ..................... 180/9.1 X

FOREIGN PATENT DOCUMENTS 744612 10/1966 Canada ............................... 305/10
0332869 9/1989 European Pat. Off. .

*Primary Examiner*—Kevin T. Hurley
*Attorney, Agent, or Firm*—Parkhurst, Wendel & Rossi

[57] ABSTRACT

Track-tensioning equipment for a vehicle, including a pulley for guiding a track of a vehicle, a crankshaft on which the pulley is rotatably mounted, a rotary hydraulic actuator for rotating the crankshaft about an axis of rotation, thereby displacing the pulley to tension the track, the rotary hydraulic actuator including a cylinder element and a piston element, one of the cylinder and piston elements being stationary and adapted to be secured to the vehicle, the other of the cylinder and piston elements being secured to the crankshaft to be rotatable therewith about the axis of rotation, and a feed and control unit for controlling the rotary hydraulic actuator.

11 Claims, 3 Drawing Sheets

TRACK-TENSIONING EQUIPMENT

BACKGROUND OF THE INVENTION

1. Field of the Invention

The invention relates to track-tensioning equipment for automotive purposes, in particular for military armored vehicles or earthwork machinery, the equipment furthermore being also applicable to tensioning chains, belts, endless belts and the like.

2. Related Art

In a track-equipped vehicle, i.e., a vehicle fitted with caterpillar treads, each track is guided by and runs on rollers resting on the ground, further running on a drive sprocket at one end of the vehicle and a tail pulley at the other vehicle end also serving to tension the track, for which purpose it cooperates with displacement means for the two mutually opposite directions for increasing and decreasing the track tension.

As a rule, the tensioning tail pulley rests on a crankshaft driven by mechanical or hydraulic means, for instance by a mechanical screw and gear configuration controlling the angular position of the crankshaft or by a hydraulic actuator with a straight-moving piston hinging by fittings on the vehicle body and on a crankshaft arm.

Such known equipment incurs many drawbacks. The hydraulic means are mounted outside the vehicle body and therefore are vulnerable to damage and susceptible to the ambient environment. Moreover, the stresses transmitted to the crankshaft bearings are very high. As regards the mechanical means, they may be mounted inside the vehicle body, but on the other hand they are complex and adjusting the track tensioning is time-consuming and also must take place while the vehicle is stopped on flat terrain and must be carried out by personnel outside the vehicle, and it is comparatively of low accuracy. Again these mechanical means are rigid and if subjected to high stresses may break at once or after a delay (in particular if soil jams between the track and its rollers), and there is substantial danger that the tracks will come off.

SUMMARY OF THE INVENTION

A particular object of the present invention is to avoid such drawbacks. The present invention provides track-tensioning equipment for averting the danger of track breakage and of the tracks coming off, while allowing easy, accurate and quick adjustment of the track tension from a vehicle control-station. Another object is equipment which can be mounted inside the vehicle body. Yet another object is equipment of this species allowing easily and rapidly to eliminate soil jammed between the track and its rollers.

Accordingly, the invention proposes track-tensioning equipment for automotive vehicles, in particular for an armored or an earthwork vehicle, which comprises a pulley guiding the track, a crankshaft bearing the pulley, a hydraulic actuator setting the crankshaft in rotation and feed and control unit for the actuator, the track-tensioning equipment being characterized in that the hydraulic actuator is rotary and comprises two components, namely a cylinder and a piston, the latter being stationary inside the vehicle body and the former being rotational about the axis of rotation of the pulley-bearing crankshaft while irrotational with respect to the crankshaft which in turn rests on and is guided in rotation by the stationary component of the rotary actuator.

The present equipment offers substantive advantages. The stresses transmitted into the bearings of the crankshaft are much lower than for an actuator with a straight-motion piston acting on an eccentric arm of the crankshaft, whereby danger of instant or delayed rupture is much reduced. The actuator can be mounted inside the vehicle body, and its bulk is slight. The track tension is easily, quickly and accurately adjusted by varying the actuator feed-pressure, such changes being controlled from the steering station of the vehicle.

As a result, the danger of the track coming off is much less than in the prior art and in most vehicle applications it will be substantially eliminated, providing substantial improvements in vehicle reliability and availability and lowering its costs.

In a preferred embodiment mode of the invention, the cylinder and piston of the rotary actuator are toroidal and the actuator cylinder is rigidly affixed to the pulley-bearing crankshaft whereas the actuator piston is stationary and integral with a case fastened on the vehicle body.

In this embodiment mode, the actuator cylinder comprises a first toroidal hollow portion receiving the piston and a second tubular cylindrical portion crossed by the pulley-bearing crankshaft, the inner cylindrical surface of the second part comprising longitudinal channels cooperating with longitudinal channels in the outer cylindrical surface of the pulley-bearing crankshaft.

The actuator case comprises two axially aligned stubs located on either side of the piston and into which are mounted bearings guiding the pulley-bearing crankshaft.

The actuator feed and control unit includes a hydraulic pump of which one output is connected by a hydraulic circuit comprising a feed means and pressure limiter to the actuator, one input of this hydraulic circuit being connected to the output of a logic circuit of which the inputs are connected to a pressure pickup responding to the internal actuator pressure, further to a pickup responding to the angular position of the movable actuator component and to control means operated by the vehicle driver.

The control means allows controlling of the vehicle-track tension from the steering station of the vehicle whatever the vehicle position on the ground.

BRIEF DESCRIPTION OF THE DRAWINGS

The invention is elucidated below, and other features, details and advantages are more clearly stated in the following illustrative description in relation to the attached drawings.

DETAILED DESCRIPTION OF THE PREFERRED EMBODIMENT

Figure 2:
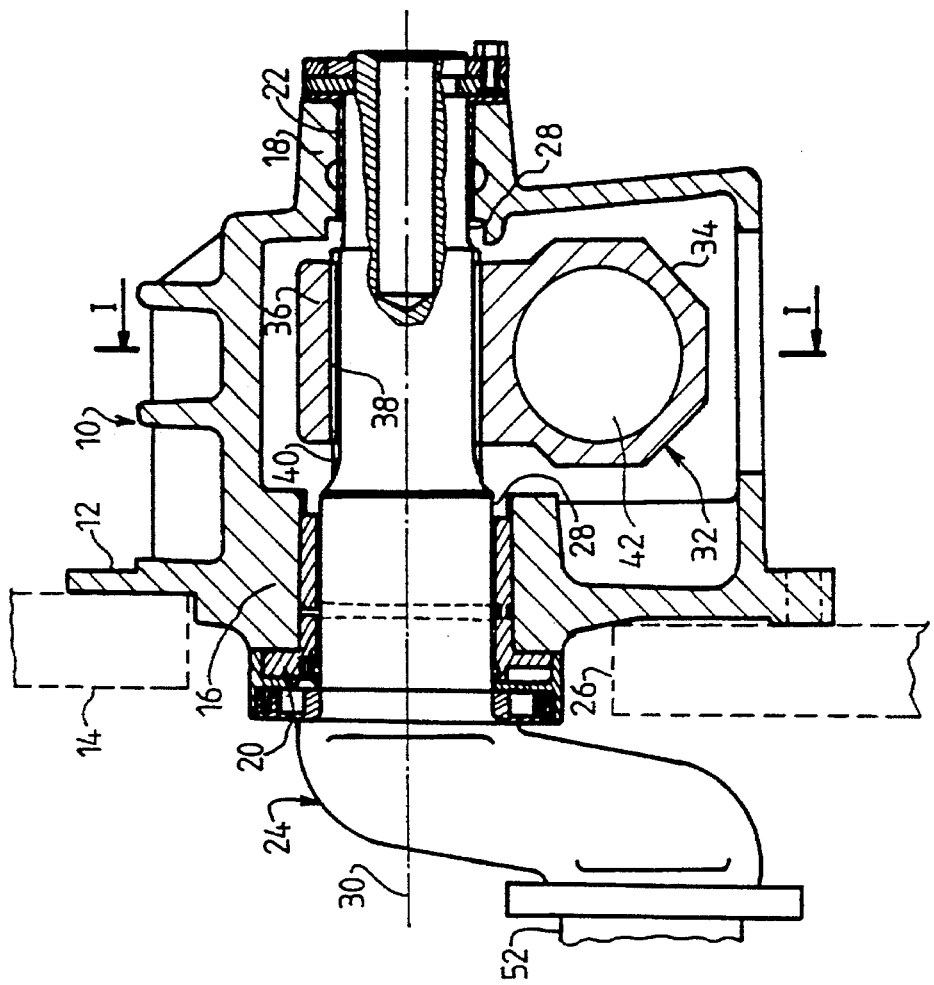
FIG. 2 is a diagrammatic longitudinal section of the actuator along line II—II of FIG. 1.
Figure 1:
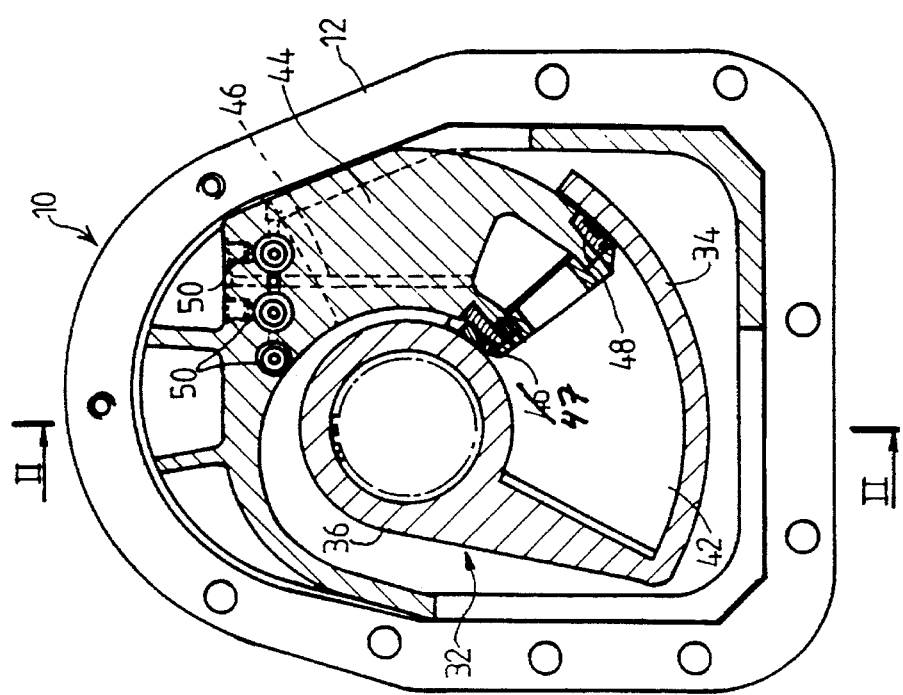
FIG. 1 is a diagrammatic cross-section along line I—I of FIG. 2 of a rotary actuator used in the equipment of the invention.

First FIGS. 1 and 2 will be discussed, which show in detailed manner the actuator driving the crankshaft in rotation, the crankshaft bearing a track-tensioning pulley in particular for the application of a military armored vehicle.

Figure 3:
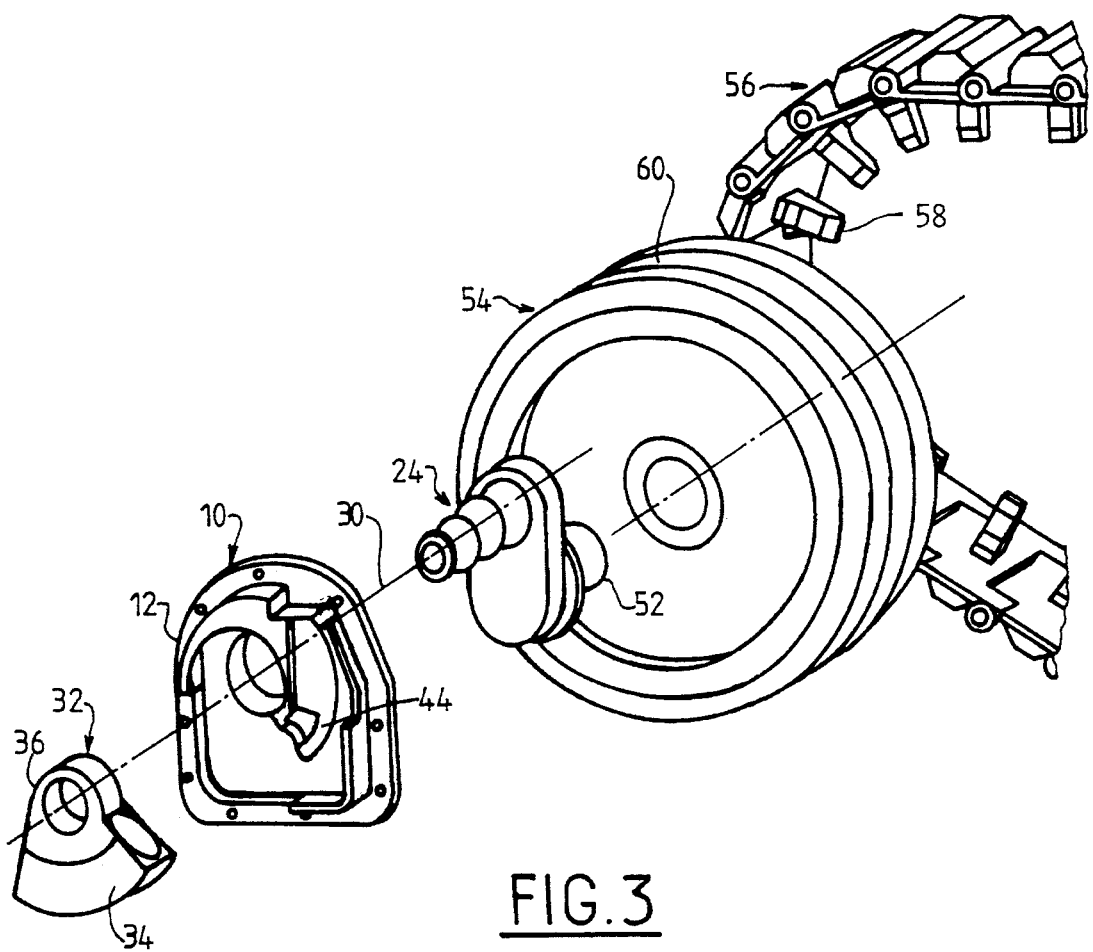
FIG. 3 is an exploded diagrammatic perspective of the equipment of the invention.

Essentially this actuator consists of a case 10 of which one end surface comprises an affixing flange 12 to be fastened to the inside surface of a component 14 of the vehicle body, the case comprising two axially aligned end stubs 16, 18 equipped with guide bearings 20, 22 for the rotation of a crankshaft 24 passing through an orifice 26 of the vehicle-body component 14, the crankshaft 24 bearing a track-tensioning pulley that shall be described in detail in relation to FIG. 3.

The part of the crankshaft 24 which is mounted in the actuator case 10 comprises two journals 28 mounted in the bearings 20, 22, the journals guiding the crankshaft 24 in rotation about the longitudinal axis 30 of the stubs 16, 18.

The part of the crankshaft 24 between the journals 28 bears a component 32 of which a portion 34 constitutes the rotary actuator cylinder and of which another portion 36 comprises a cylindrical passage for assembly onto the crankshaft 24, the cylindrical passage comprising longitudinal channels 38 engaging longitudinal splines 40 of the part of the crankshaft 24 located between the journals 28.

The portion 34 of the component 32 comprises a toroidal passage 42 open at one end and closed at the other and angularly extending by about 90°, receiving a piston 44 integral with the case 10.

This piston 44 also is toroidal and is fitted at its free end with seals and/or segments 47, 48 cooperating with the internal surface of the toroidal passage 42 of the, component 32.

In this manner the component 32 and the piston 44 formed by the case 10 constitute a rotary actuator of which the piston is stationary and of which the cylinder is rotatable about the axis 30 and is irrotational relative to the crankshaft 24.

This rotary actuator is single-acting and is fed with a pressurized liquid through a conduit 46 through the piston 44 and issuing inside the toroidal passage 42. The piston 44 moreover comprises seats 50 communicating with the feed conduit 46 and receiving hydraulic components including a distributor and a pressure limiter as well as a pressure pickup or a connector to a pressure pickup. Where called for the seats 50 may receive only adapters to the hydraulic components in lieu of the components themselves.

As clearly shown by FIG. 3, the crankshaft 24 associated with this rotary actuator comprises an eccentric crankpin 52 affixed in rotary manner to a pulley 54 for guiding and tensioning a track 56. This track comprises guide teeth 58 on its inside surface which enter a middle channel 60 of the pulley 54 to secure the track laterally or transversely on the pulley.

As shown by FIG. 3, clockwise rotation of the crankshaft 24 about the axis 30 shall increase the tensioning of the track 56 whereas counterclockwise rotation of said crankshaft shall decrease such tensioning.

Figure 4:
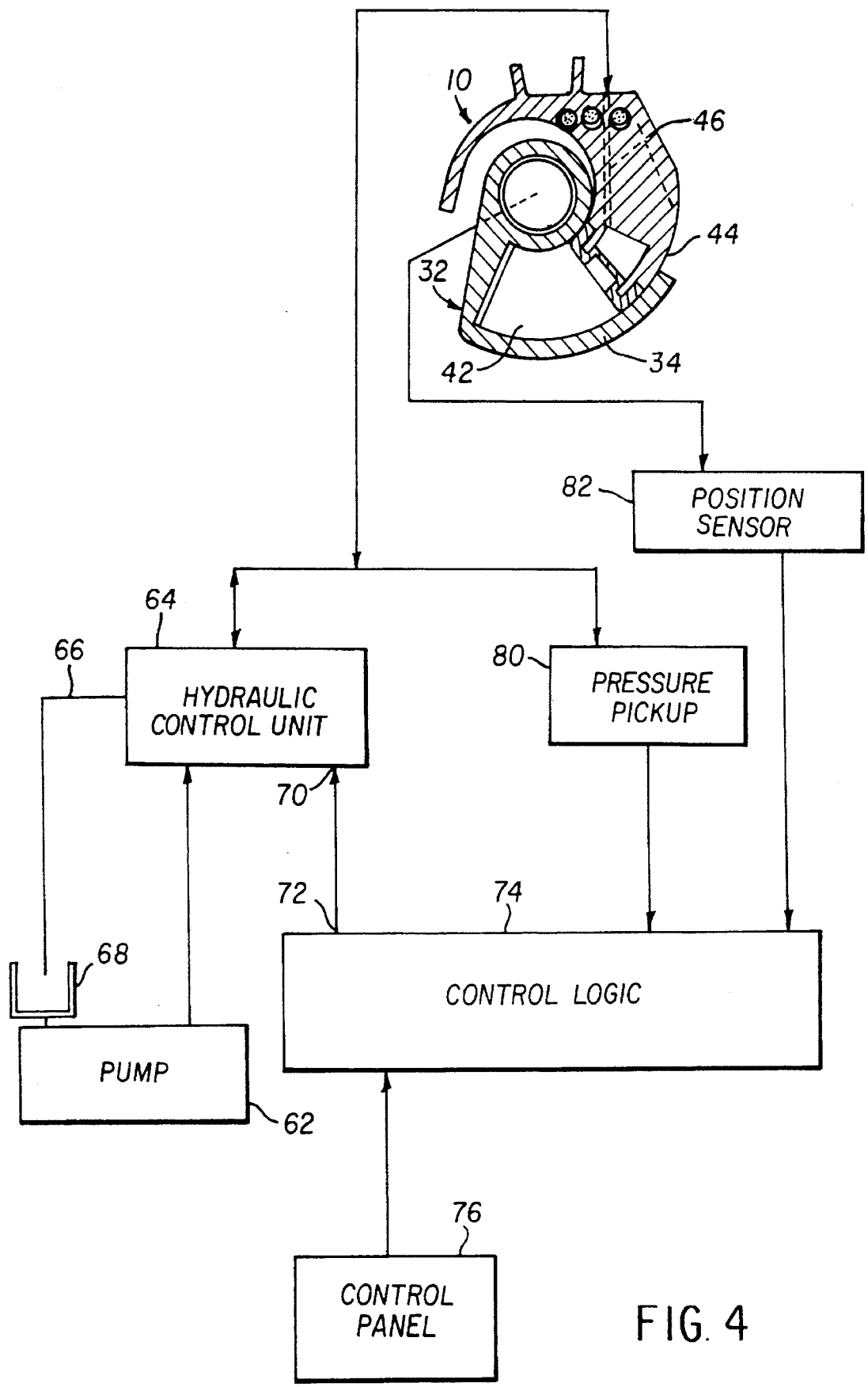
FIG. 4 schematically shows the feed and control unit of the equipment of the invention.

The rotation in either direction of the crankshaft 24 is controlled by the system of FIG. 4 showing the rotary actuator constituted by the affixed piston 44 entering the toroidal passage 42 of the component 32 rigidly joined to the crankshaft 24.

The actuator is fed with pressurized liquid from a pump 62 through a hydraulic control unit comprising a pressure limiter and a two-way, two-orifice valve connecting the output of the pump 62 either to the actuator feed conduit 46 or this conduit 46 to an outlet conduit 66 leading to a tank 68 to allow the actuator to exhaust or drain. An input 70 of the circuit 64 is connected to an output 72 of a logic circuit 74 of which the inputs are connected to the outputs of a control panel 76 operable by the driver and to the outputs of a pressure pickup 80 responding to the pressure in the rotary actuator and the outputs of a position sensor 82 responding to the angular position of the component 32 or of the crankshaft 24.

Accordingly, the pressure limiter in the control circuit 64 allows limiting the pressure in the rotary actuator and thereby the track tension to a value that shall preclude immediate or delayed rupture of the tensioning equipment.

The feed and control unit of FIG. 4 is operated in the following manner:

The track tensioning is initially carried out on flat ground while the vehicle is stopped by the driver who controls the pressurized-liquid feed to the rotary actuator by means of the pump 62 until a reference pressure is reached in the said actuator. Thereupon the position sensor 82 provides a reference signal of the angular position of the component 32 or of the crankshaft 24. Thereafter the track may be tensioned for all vehicle positions (climbing or descending, leaning, in ditches).

In any vehicle motion on the road or on any terrain, the rotary actuator is insulated from the ambient environment, its internal pressure remaining less than or equal to the maximum value set by the pressure limiter present in the circuit 64. Any abnormality is sensed by the position sensor 82 signalling that the tensioning equipment has moved away from its initial position.

When the vehicle is used for earth work, the track tension may increase on account of soil jamming between the track and its rollers. The pressure in the rotary actuator remains limited to the maximum value set by the pressure limiter integrated into the circuit 64. When required, the rotary actuator will be supplied from the pump 62 delivering a liquid output no more than sufficient to follow at substantially constant pressure the motions of the tensioning pulley 54.

If called for, the vehicle driver uses the control panel 76 to put the rotary actuator on exhaust or drain to maximally relax the track, for instance to remove soil jammed between the track and the rollers or to allow action on the tensioning equipment or on the sprocket reducer.

On the whole the equipment of the invention offers the advantage of high compactness, of using an actuator of very few parts, and of making possible all track-tension adjustments from the vehicle driver station without transmitting excessive stresses to the crankshaft bearings holding the tensioning pulley.

Obviously a number of variations of the above described equipment may be used by the expert. Illustratively the rotary actuator may be double-acting, and for such a purpose it suffices to endow the piston 44 with symmetry and to provide a toroidal housing 42 at each piston end. Also this rotary actuator may be fitted with a double case to achieve a pure couple of rotation: for such a purpose, it suffices that the cylinder and the piston be symmetrical relative to the axis of rotation.

What is claimed is:

1. Track-tensioning equipment for a vehicle, comprising:
   a pulley for guiding a track of a vehicle;
   a crankshaft on which said pulley is rotatably mounted;
   a rotary hydraulic actuator for rotating said crankshaft about an axis of rotation, thereby displacing said pulley to tension the track, said rotary hydraulic actuator comprising a cylinder element and a piston element, one of said cylinder and piston elements being stationary and adapted to be secured to the vehicle, the other of said cylinder and piston elements being secured to said crankshaft to be rotatable therewith about said axis of rotation; and feed and control means for controlling the rotary hydraulic actuator.

2. The equipment of claim 1, wherein each of said cylinder and piston elements is toroidal.

3. The equipment of claim 1, further comprising a case for holding the rotary hydraulic actuator, said case being secured to the vehicle, wherein said cylinder element is secured to the crank shaft, and said piston is integrated with said case.

4. The equipment of claim 3, wherein said cylinder element has a toroidal orifice for receiving the piston having a complementary toroidal shape, said cylinder element further including a cylindrical orifice in which said crankshaft is secured.

5. The equipment of claim 4, wherein said crankshaft comprises splines which fit into complementary channels in said cylindrical orifice.

6. The equipment of claim 3, wherein said case comprises first and second stub portions spaced apart from each other along the crankshaft such that the first and second stub portions are on opposite sides of the cylinder element, each stub portion including guide bearings for rotatably supporting said crankshaft.

7. The equipment of claim 3, wherein said piston includes a feed liquid conduit extending therethrough.

8. The equipment of claim 7, wherein said feed liquid conduit opens into said cylinder element.

9. The equipment of claim 7, further comprising a plurality of seats for connecting hydraulic components to said feed liquid conduit, said hydraulic components including a pressure limiter, a distributor and a pressure pickup.

10. The equipment of claim 1, wherein said feed and control means comprises (i) a hydraulic pump having an output which is connected to the rotary hydraulic actuator through a hydraulic circuit, the hydraulic circuit comprising a pressure limiter and a distributor, (ii) a control logic circuit connected to the hydraulic circuit for controlling the hydraulic circuit, (iii) a position sensor and a (iv) pressure pickup being connected to the control circuit for communicating the position of and pressure within the rotary hydraulic actuator, and (v) a control panel connected to the control logic circuit.

11. The equipment of claim 1, wherein said crankshaft has an offset crankpin portion on which said pulley is rotatably mounted.

* * * * *